United States Patent [19]

Alexander et al.

[11] Patent Number: 4,824,901

[45] Date of Patent: Apr. 25, 1989

[54] SURFACE TREATED ABSORBENT POLYMERS

[75] Inventors: William Alexander, Naperville; Mark Anderson, Wheaton; Barbara R. Regan, Glenview, all of Ill.

[73] Assignee: American Colloid Company, Arlington Heights, Ill.

[21] Appl. No.: 185,853

[22] Filed: Apr. 25, 1988

Related U.S. Application Data

[62] Division of Ser. No. 872,654, Jun. 10, 1986.

[51] Int. Cl.$^4$ ............................................. C08F 8/32
[52] U.S. Cl. ....................................... 524/555; 524/556; 524/560; 524/562; 524/828; 524/831; 524/832
[58] Field of Search ................. 524/555, 560, 562, 556

[56] References Cited

U.S. PATENT DOCUMENTS

| | | | |
|---|---|---|---|
| Re. 31,822 | 2/1985 | Erickson et al. | 128/156 |
| 2,956,046 | 10/1960 | Glavis et al. | 260/805 |
| 2,978,501 | 4/1961 | Adams | 260/526 |
| 2,980,655 | 4/1961 | Glass | 260/803 |
| 2,985,625 | 5/1961 | Jones | 260/78 |
| 2,985,631 | 5/1961 | Jones | 260/78.5 |
| 3,215,659 | 11/1965 | Spaulding | 260/29.6 |
| 3,426,004 | 2/1969 | Wagner | 260/80.3 |
| 3,670,731 | 6/1972 | Harmon | 128/284 |
| 3,723,413 | 3/1973 | Chatterjee et al. | 260/232 |
| 3,784,597 | 1/1974 | Fujimoto et al. | 260/80.3 N |
| 3,901,236 | 8/1975 | Assarsson et al. | 128/284 |
| 3,980,663 | 9/1976 | Gross | 260/29.6 |
| 3,997,484 | 12/1976 | Weaver et al. | 260/17.4 C |
| 4,057,521 | 11/1977 | Gross | 260/29.6 |
| 4,058,124 | 11/1977 | Yen et al. | 128/284 |
| 4,062,817 | 12/1977 | Westerman | 260/17.45 G |
| 4,076,663 | 2/1978 | Masuda et al. | 260/17.4 GC |
| 4,124,748 | 11/1978 | Fujimoto et al. | 526/8 |
| 4,190,562 | 2/1980 | Westerman | 260/17.4 UC |
| 4,200,736 | 4/1980 | Shinohara et al. | 536/87 |
| 4,286,082 | 8/1981 | Tsubakimoto et al. | 526/240 |
| 4,295,987 | 10/1981 | Parks | 252/194 |
| 4,340,706 | 7/1982 | Obayashi et al. | 526/207 |
| 4,351,922 | 9/1982 | Yoshida et al. | 525/116 |
| 4,389,513 | 6/1983 | Miyazaki | 525/186 |
| 4,415,388 | 11/1983 | Korpmann | 156/78 |
| 4,473,689 | 9/1984 | Login et al. | 526/81 |
| 4,500,670 | 2/1985 | McKinley et al. | 524/445 |
| 4,522,997 | 6/1985 | Schmitz et al. | 526/264 |
| 4,525,527 | 6/1985 | Takeda et al. | 524/831 |
| 4,535,098 | 8/1985 | Evani et al. | 521/149 |
| 4,552,938 | 11/1985 | Mikita et al. | 526/240 |
| 4,562,114 | 12/1985 | Sawanishi et al. | 428/372 |
| 4,612,250 | 9/1986 | Takeda et al. | 428/500 |
| 4,618,631 | 10/1986 | Takeda et al. | 521/109.1 |
| 4,654,039 | 3/1987 | Brandt et al. | 604/368 |
| 4,654,393 | 3/1987 | Mikita et al. | 526/240 |
| 4,677,174 | 6/1987 | Alexander et al. | 526/240 |

FOREIGN PATENT DOCUMENTS 1160984 1/1984 Canada.

Primary Examiner—Joseph L. Schofer
Assistant Examiner—Bernard Lipman
Attorney, Agent, or Firm—Mason, Kolehmainen, Rathburn & Wyss

[57] ABSTRACT

Surface treating water-absorbent resins with a polyquaternary amine substantially increases both the rate of water absorption and the quantity of water absorbed and retained by the resin. In addition to improved water absorbing properties, the surface-treated resins maintain the necessary "dry feel" required for most applications.

32 Claims, 9 Drawing Sheets

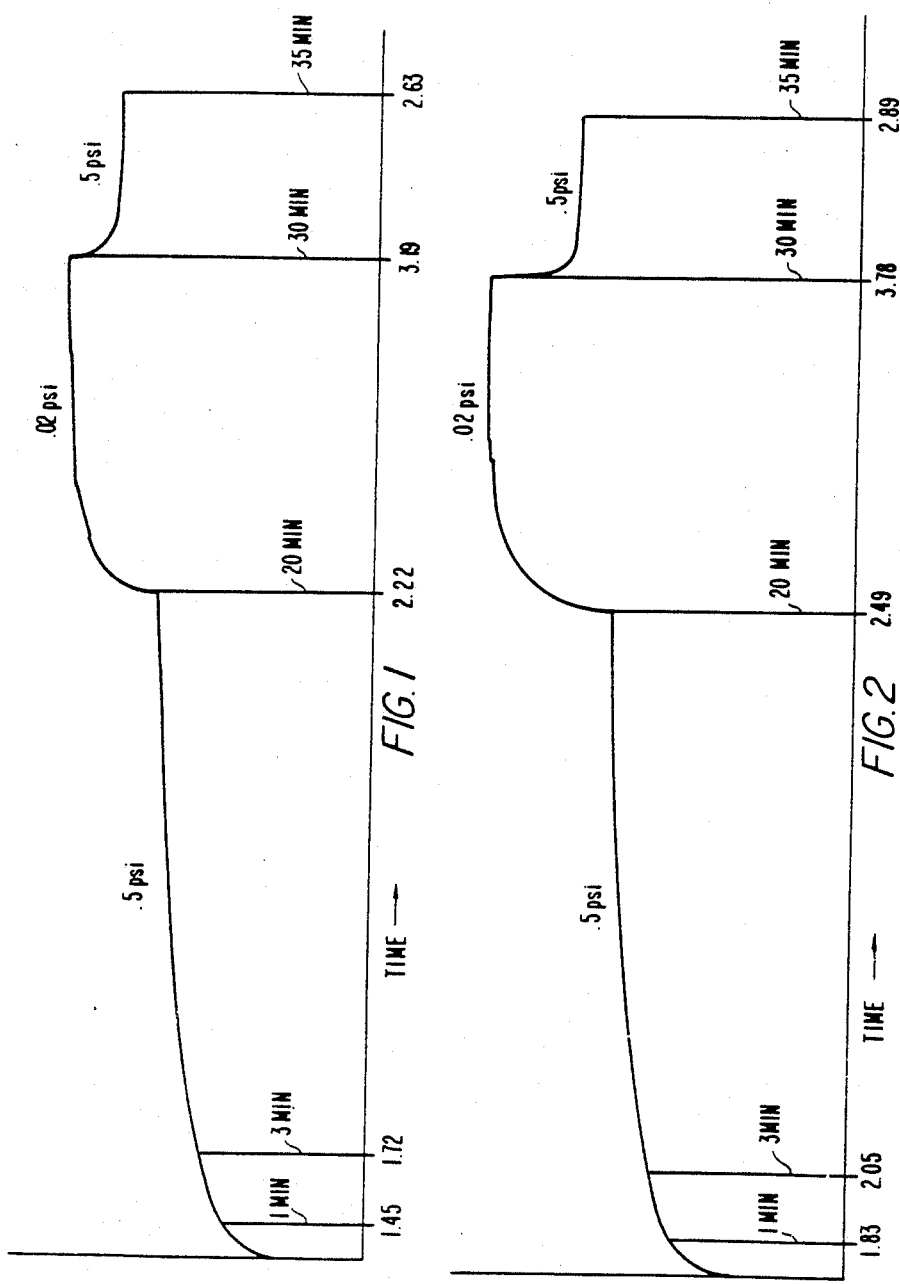

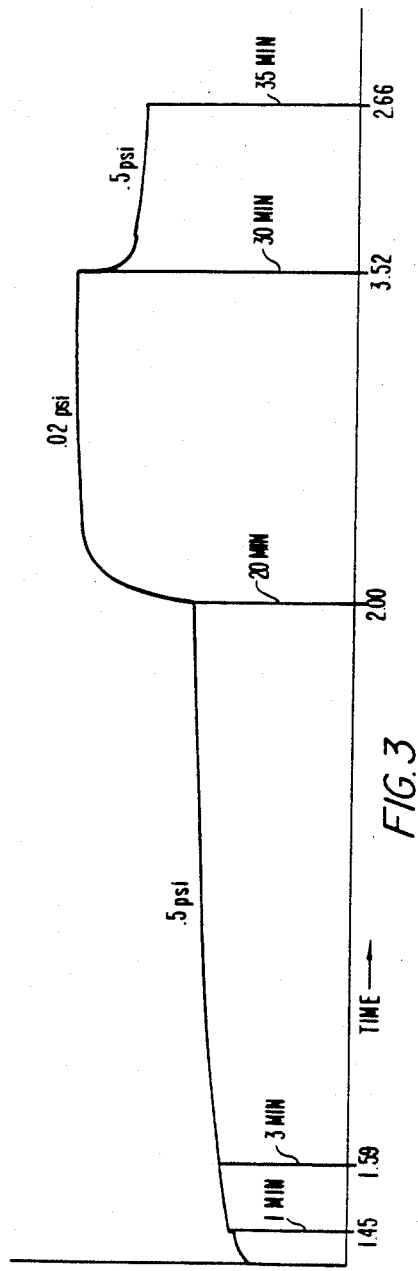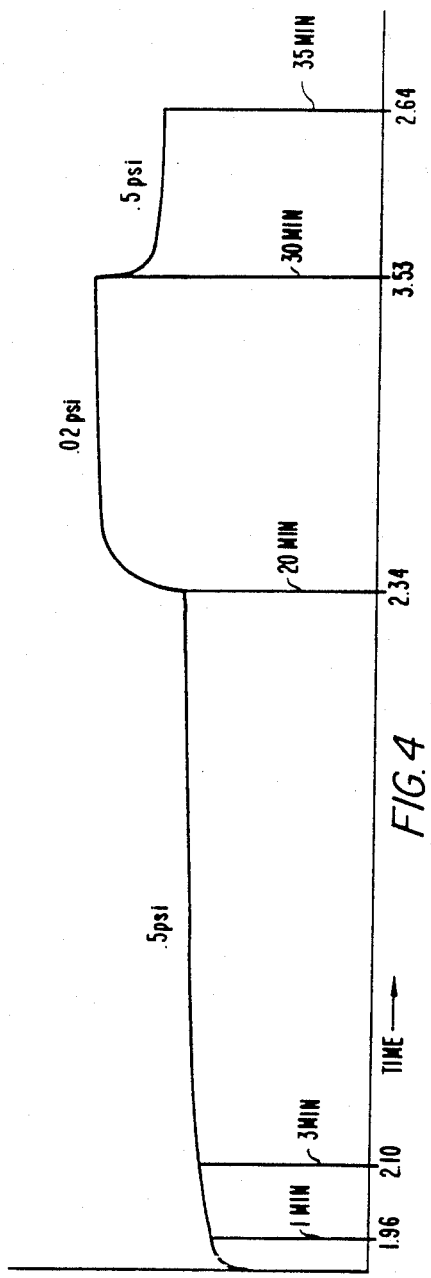

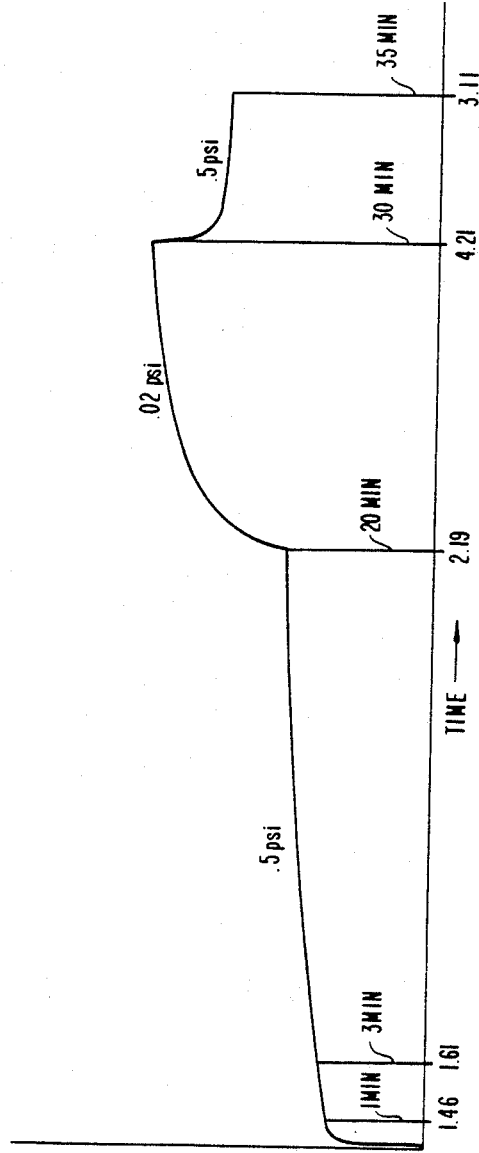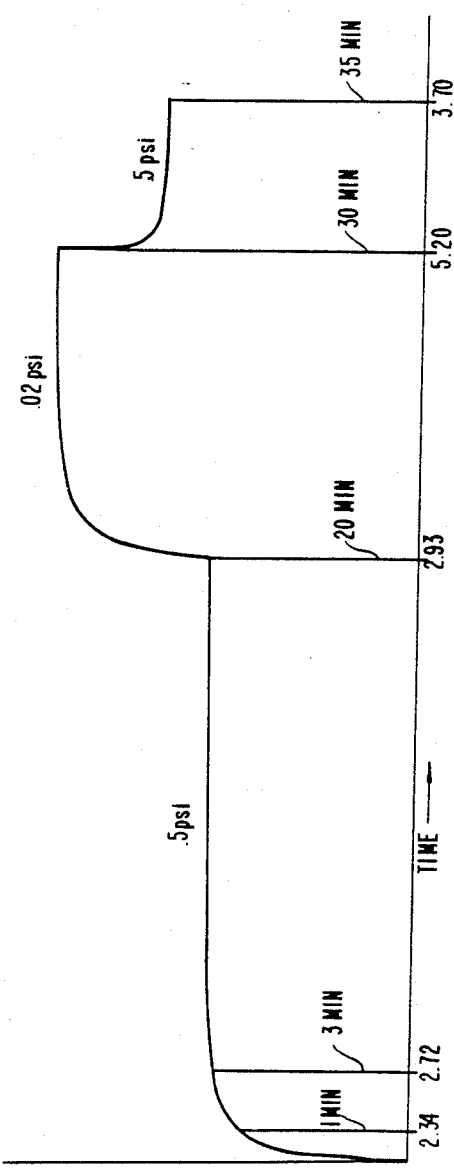

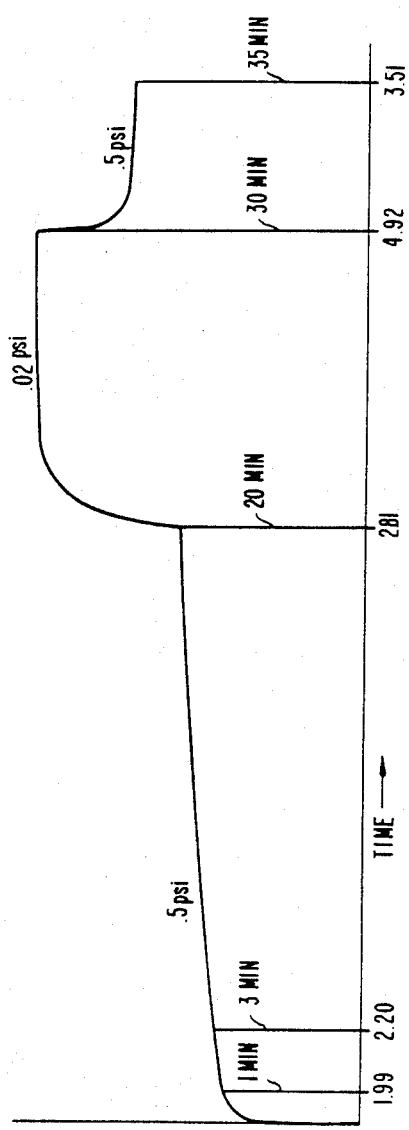
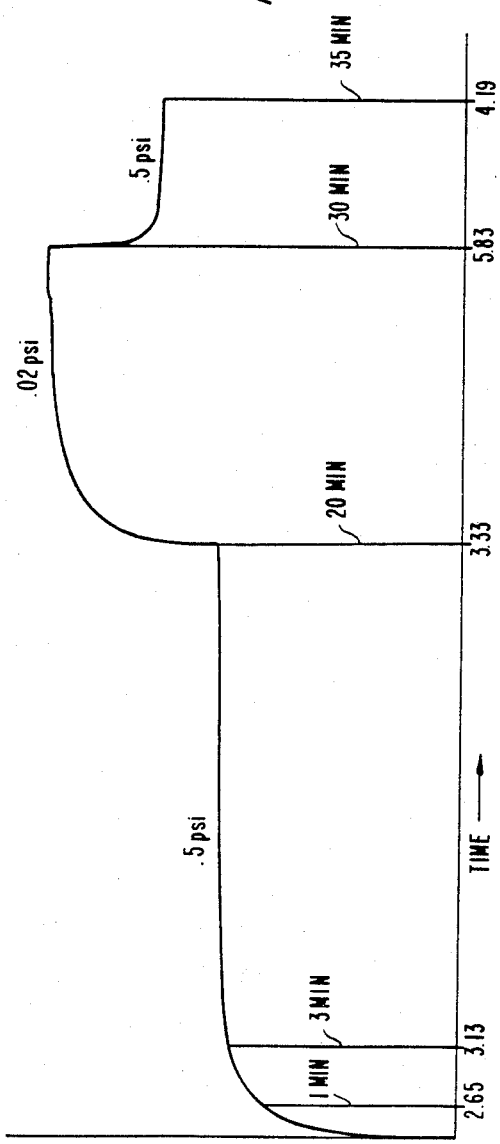

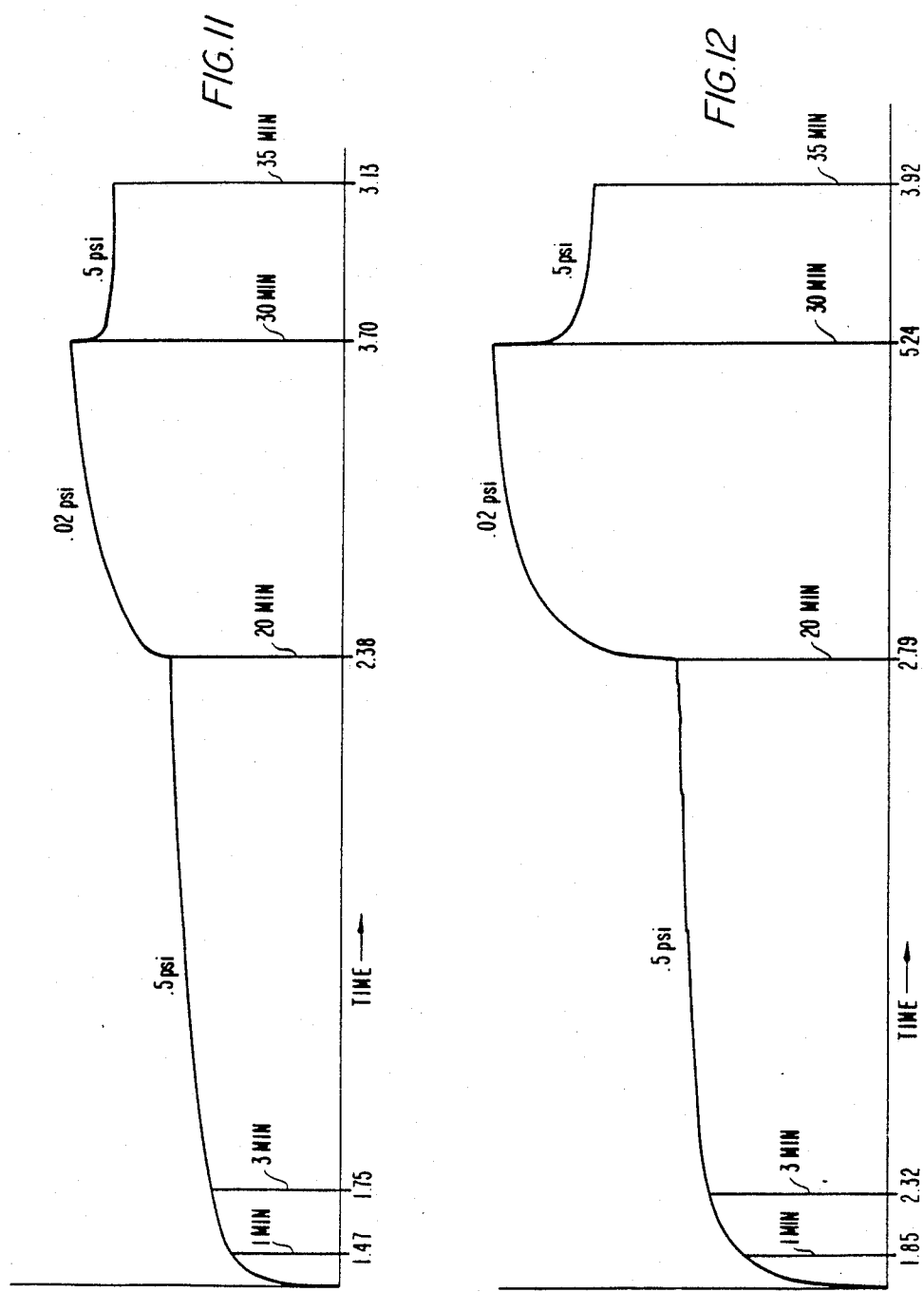

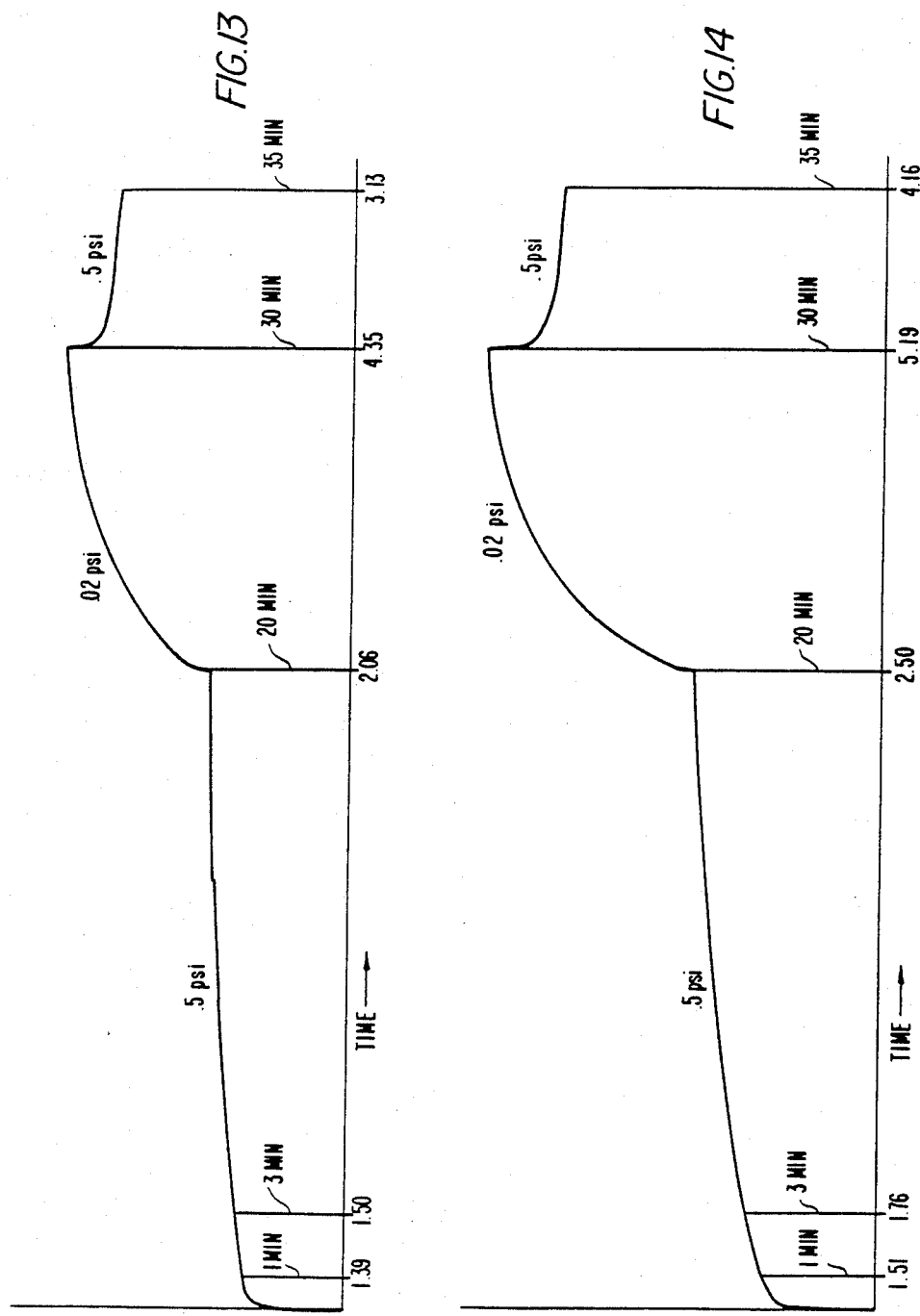

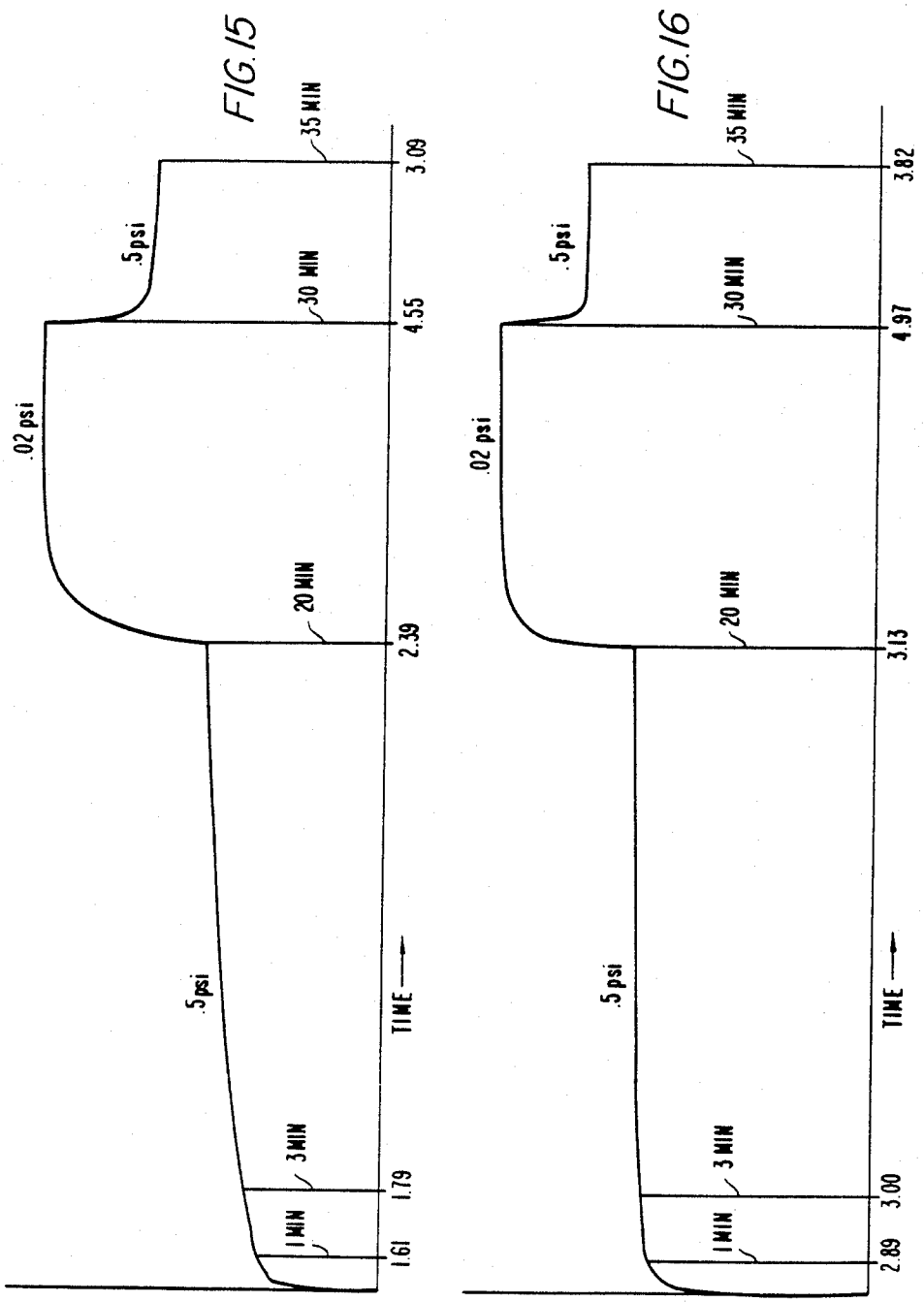

SURFACE TREATED ABSORBENT POLYMERS

This is a division of application Ser. No. 872,654, filed June 10, 1986.

FIELD OF THE INVENTION

The present invention relates to a method of surface treating a water-absorbent resin, of actual or pseudo-anionic character, with a cationic polymer, to substantially and unexpectedly increase the water absorption and water retention properties of the water-absorbent resin. More particularly, the present invention relates to a method of surface treating a water-absorbent resin, such as a neutralized, crosslinked, homopolymer or copolymer of acrylic acid, with a polyquaternary amine to improve the water absorption and water retention properties of the resin.

BACKGROUND OF THE INVENTION

Water-absorbent resins have found wide use in a variety of applications, including sanitary goods, hygienic goods, water retaining agents, dehydrating agents, sludge coagulants, condensation preventing agents and release control agents for various chemicals. Water-absorbent resins are available in a variety of chemical forms including substituted and unsubstituted natural and synthetic polymers such as hydrolysis products of starch-acrylonitrile graft polymers, carboxymethylcellulose, crosslinked polyacrylates, polyvinyl alcohols, polyacrylonitrile, polyvinylpyrrolidones, sulfonated polystyrenes, hydrolyzed polyacrylamides and polyethylene oxide.

Each type of water-absorbent resin differs in ease and cost of manufacture, chemical and physical properties, rate of water absorption, and degree of water absorption and retention, thus making the ideal water-absorbent resin a difficult composition to find. For example, the hydrolysis products of starch-acrylonitrile graft polymers have a comparatively high ability to absorb water, but require a cumbersome process for production and have the disadvantages of low heat resistance and decaying or decomposing easily due to the presence of starch. Conversely, other water-absorbent polymers are easily and cheaply manufactured and are not subject to decomposition, but do not absorb liquids as well as the starch-acrylonitrile graft polymers.

Therefore, it would be extremely advantageous to provide a method of increasing the water absorption properties of a stable, easy to manufacture water-absorbent resin to match the superior water absorption properties of a difficult to manufacture polymer. Likewise, it would be advantageous to increase the liquid absorption properties of an already superior water-absorbent resin.

Any method of improving the water absorption properties of the resin must also retain the "dry feel" of the resin after liquid absorption. Although water and liquid absorption is the primary function of the water-absorbent resin, in many applications it is almost equally important that the polymer maintain its "dry feel". The polymer must be able to absorb amounts of water several times its weight, plus be sufficiently crosslinked to avoid partial solubilization of the polymer to form a gel and lead to a slippery, wet feeling. Presently, water-absorbent polymers do possess a "dry feel" after significant water absorption, thus any methods directed to improving the water-absorbent properties of the resin should not alter the basic "dry feel" after liquid absorption.

Any treatment of a water-absorbent resin both increasing the water absorption capabilities and maintaining its basic "dry feel" would enhance and broaden the application possibilities of many water-absorbent polymers. Such a treatment should be simple and economical to avoid increases in the raw material cost or manufacturing cost of the basic polymer.

SUMMARY OF THE INVENTION

In brief, the present invention is directed to a method of surface treating a water-absorbent resin with a sufficient amount of polyquaternary amine to substantially improve the water-absorbent and water retention properties of the resin. It has been found that the surface treatment can be applied to a dried polymer at any time, either immediately prior to using the polymer or by incorporating the treatment into a manufacturing step immediately following the polymerization reaction and polymer drying steps.

In accordance with the present invention, a water-absorbent resin, possessing either true anionic character due to full negative electrical charges present along the polymer backbone or pseudo-anionic character due to polar bonds imparting partial negative electrical charges along the polymer backbone, can possess improved water absorption and water retention properties by surface treatment with a polyquaternary amine. The treatment with polyquaternary amine has been found especially effective when performed on polyacrylate salts, hydrolyzed polyacrylamides or other polymers having a plurality of neutralized carboxyl groups in their backbone.

Therefore, the present invention is directed to a process of treating water-absorbent resins with a polyquaternary amine to substantially increase the water absorption and water retention properties of the resin. More particularly, the present invention is directed to a process for preparing water-absorbent crosslinked acrylate resins by aqueous polymerization of (A) acrylic acid neutralized 70 to 100 mole percent for example with ammonia, and/or caustic alkali and/or an amine; with (B) styrene and/or methyl methacrylate in an amount of 0% to 25% based on the weight of acrylic acid or acrylate, computed as based on acrylic acid; and (C) acrylamide in a mole ratio of 70 to 100 mole percent (A) to 30 to 0 mole percent (C); and (D) a water miscible or a water soluble polyvinyl monomer in an amount of 0.001 to 0.3 weight percent based on the total weight of (A), (B), (C) and (D). To achieve the full advantage of the present invention the monomer concentration of (A), (B) and (C) is at least 50 wt. % of the aqueous solution. After synthesis, the resin is dried to an acceptable water content of at least less than 15% by weight of the polymer, and thereafter the resin is contacted with a polyquaternary amine in an amount sufficient for interaction to substantially improve the water-absorbent and water retention properties of the resin. A "dry feel" is obtained, and retained, at a polyvinyl monomer concentration of at least 0.2 wt. percent of the aqueous solution.

In accordance with an important embodiment of the present invention, a heated aqueous solution comprising (A) acrylic acid neutralized 70 to 100 mole percent, for example with ammonia, and/or caustic alkali and/or an amine; and (B) styrene and/or methyl methacrylate in an amount of 0% to 25% based on the amount of acrylic acid and acrylate, computed as based on the weight of acrylic acid; and (C) a water-miscible to water-soluble polyvinyl monomer, water and, when desired, an organic solvent having a boiling point of 40° to 150° C., and having a combined monomer concentration of (A) plus (B) plus (C) of 30 to 80 wt. % is subjected to copolymerization in the presence of a polymerization initiator without external heating while allowing water to evaporate off. After sufficient water has evaporated so that the polymer has about 15% by weight water or less, the polymer is contacted with a polyquaternary amine to substantially increase the water absorbency and water retention properties of the polymer.

Therefore, it is an object of the present invention to surface treat water-absorbent polymers to substantially increase the water absorption and water retention properties of the polymer.

It is also an object of the present invention to surface treat water-absorbent resins with a polyquaternary amine to substantially increase the water absorption and water retention properties of the resins.

Another object of the present invention is to surface treat a water-absorbent resin, possessing actual or pseudo-anionic character, with a polyquaternary amine to substantially increase the water absorption and water retention properties of the resin.

Another object of the present invention is to surface treat a water-absorbent polyacrylate salt, a polyacrylamide or a polymer having a plurality of neutralized carboxyl groups with a polyquaternary amine to substantially increase the water absorption and water retention properties of the polymer.

Another object of the present invention is to surface treat the water-absorbent resin with a polyquaternary amine immediately after synthesizing, drying and sizing the resin.

Another object of the present invention is to provide a process for preparing a water-absorbent cross-linked acrylate resin copolymer of low water content by aqueous solution polymerization without any additional dehydrating or drying step, and thereafter contacting the resin with a polyquaternary amine in an amount sufficient for interaction to substantially improve the water absorbency and water retention properties of the resin.

Another object of the present invention is to provide a process for preparing a cross-linked polyacrylate resin copolymer by copolymerization of partially or fully neutralized acrylic acid; a styrene and/or methyl methacrylate monomer; and a water-miscible to water soluble polyvinyl monomer in a combined concentration of 30 to 80% by weight partially or fully neutralized acrylic acid and 0% to 25% styrene and/or methyl methacrylate, based on the weight of acrylic acid, in water and initiating polymerization without external heating and thereafter contacting the resin with a polyquaternary amine in an amount sufficient for interaction to substantially improve the water absorbency and water retention properties of the resin.

Another object of the present invention is to provide a process for preparing a cross-linked polyacrylate resin copolymer by copolymerization of acrylic acid neutralized 70-100 mole percent, with styrene and/or methyl methacrylate and a polyvinyl monomer in proportions of 30 to 80% by weight partially or fully neutralized acrylic acid; 0 to 25% based on the weight of acrylic acid, of styrene and/or methyl methacrylate and 0% to 30% by weight acrylamide, based on the weight of acrylic acid, in aqueous solution, and thereafter contacting the resin with a polyquaternary amine in an amount sufficient for interaction to substantially improve the water absorbency and water retention properties of the resin.

Another object of the present invention is to provide a process for producing a polyacrylate resin copolymer cross-linked with 0.2 weight percent to 0.6 weight percent based on the weight of monomers, of a water miscible or water soluble polyvinyl monomer cross-linking agent and thereafter contacting the resin with a polyquaternary amine in an amount sufficient for interaction to substantially improve the water absorbency and water retention properties of the resin and to maintain a "dry feel" to the resin after significant water absorption.

BRIEF DESCRIPTION OF THE DRAWINGS

The above and other objects and advantages of the present invention will become apparent from the following detailed description of the present invention taken in conjunction with the drawings, wherein:

FIG. 1 is a graph obtained using a gravimetric absorbency testing system (GATS) showing the water absorbency vs. time for an acrylic homopolymer.

FIG. 2 is a graph obtained using a gravimetric absorbency testing system (GATS) showing the water absorbency vs. time for the same acrylic homopolymer used to obtain FIG. 1 after surface treatment with 0.3% of a polyquaternary amine (by dry weight).

FIGS. 3 and 4 are GATS graphs showing water absorbency vs. time for an acrylic-styrene copolymer having 1% styrene without surface treatment and with surface treatment by 0.3% of a polyquaternary amine (by dry weight), respectively.

FIGS. 5 and 6 are GATS graphs showing water absorbency vs. time for an acrylic-styrene copolymer having 2% styrene without surface treatment and with surface treatment by 0.3% of a polyquaternary amine (by dry weight), respectively.

FIGS. 9 and 10 are GATS graphs showing water absorbency vs. time for an acrylic-styrene copolymer having 6% styrene without surface treatment and with surface treatment by 0.6% polyquaternary amine (by dry weight), respectively.

FIGS. 11 and 12 are GATS graphs showing water absorbency vs. time for an acrylic-styrene copolymer having 10% styrene without surface treatment and with surface treatment by 0.5% polyquaternary amine (by dry weight), respectively.

FIGS. 13 and 14 are GATS graphs showing water absorbency vs. time for an acrylic-styrene copolymer having 15% styrene without surface treatment and with surface treatment by 0.5% polyquaternary amine (by dry weight), respectively.

FIGS. 15 and 16 are GATS graphs showing water absorbency vs. time for an acrylic-methyl methacrylate copolymer having 10% methyl methacrylate without surface treatment and with surface treatment by 0.8% polyquaternary amine (by dry weight), respectively.

DETAILED DESCRIPTION OF THE INVENTION

Figure 7:
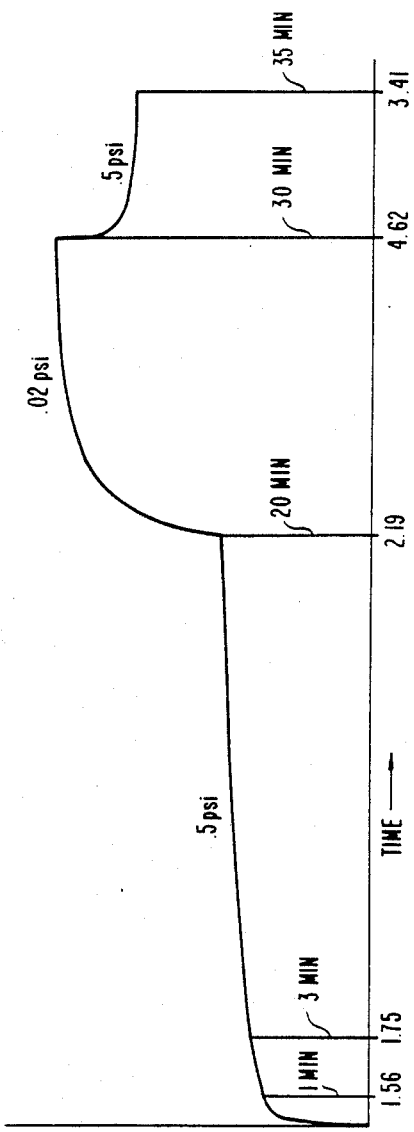
FIGS. 7 and 8 are GATS graphs showing water absorbency vs. time for an acrylic-styrene copolymer having 4% styrene without surface treatment and with surface treatment by 0.5% of a polyquaternary amine (by dry weight), respectively.
Figure 8:
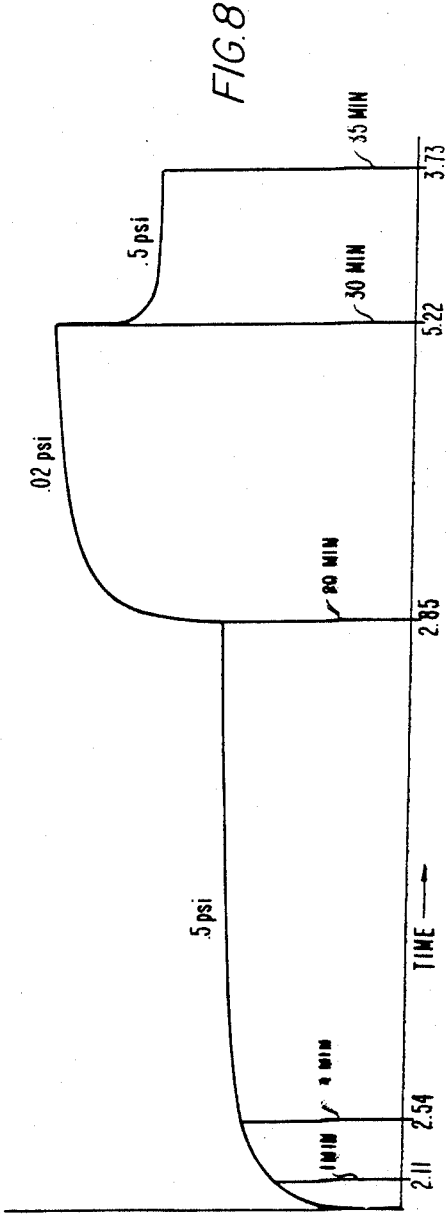

In accordance with the present invention, water-absorbent resins are surface treated with polyquaternary amines to substantially and unexpectedly increase the rate of water absorption, amount of water absorption and overall retention of water by the resin. Treatment of the polymer at any time after synthesis and sufficient drying will improve its water absorption properties; however, for economics and ease of manufacture, the surface treatment is most advantageously performed immediately after the polymer is synthesized, dried to an appropriate water content and sized, such as by grinding.

As will become apparent from the following description of the invention, the polyquaternary amine surface treatment will substantially and unexpected function to improve the water absorption properties of any polymer having anionic or pseudo-anionic characteristics arising from full or partial negative electrical charges present along the backbone of the polymer. Of particular utility are polymers containing a plurality of neutralized carboxyl groups along the polymer chain, such as fully or partially neutralized polyacrylic acid or partially hydrolyzed polyacrylamide, since these polymers are easy to synthesize, easy to surface treat and they exhibit substantial and unexpected improvements in water absorption properties.

Surface treatment with an electrically positive-charged polyquaternary amine will substantially improve the water absorption properties of a water-absorbent resin that is anionic or pseudo-anionic in character if at least some of the full or partial negative electric charges are accessible for contact with the polyquaternary amine. Several water-absorbent polymers, both synthetic resins and modified natural resins, possess the necessary anionic characteristics to benefit from a surface treatment with a polyquaternary amine.

Generally, polymers that are anionic in nature have carboxyl, sulfonate, sulfate or phosphate groups incorporated along the polymer chain. Polymers containing these anionic moieties are synthesized either from monomers previously substituted with one or more of these anionic functional groups or by incorporating the anionic functional group into the polymer after synthesis. To incorporate carboxyl groups into a polymer, any of a number of ethylenically unsaturated carboxylic acids, exemplified by acrylic acid, methacrylic acid, maleic acid, maleic anhydride, itaconic acid, itaconic anhydrice, fumaric acid, crotonic acid and half esters or half amides of maleic, fumaric and itaconic acid, may be homopolymerized or copolymerized. The carboxyl group may also be incorporated into the polymer chain indirectly by hydrolyzing the homopolymers and copolymers of monomers such as acrylamide, acrylonitrile, methacrylamide and alkyl acrylates or methacrylates.

Sulfonate-containing polymers may be prepared by homopolymerizing or copolymerizing ethylenically unsaturated sulfonic acids such as styrene sulfonic acid, 2-vinyl-4-ethylbenzene sulfonic acid, 2-allylbenzene sulfonic acid, 2-sulfo-4-vinylfurane, ethylenesulfonic acid, 1-phenylethylene sulfonic acid, α-sulfoacrylic acid and α-sulfoethylene sulfonic acid. Sulfonate-containing polymers may also be prepared from monomers containing functional groups hydrolizable to the sulfonic acid form, including alkenyl sulfonic acid compounds and sulfoalkylacrylate compounds.

Sulfate-containing polymers are prepared by reacting homopolymers or copolymers containing hydroxyl groups or residual ethylenic unsaturation with sulfuric acid or sulfur trioxide. Examples of such treated polymers include sulfated polyvinylalcohol, sulfated hydroxyethyl acrylate and sulfated hydroxypropyl methacrylate. Phosphate-containing polymers are prepared by homopolymerizing or copolymerizing ethylenically unsaturated monomers containing a phosphoric acid moiety, such as methacryloxy ethyl phosphate.

The incorporation of anionic groups into the polymer is not limited to synthetic polymers. Carboxylated, sulfonated, sulfated and phosphated derivations of cellulose or starch, such as carboxymethyl cellulose or carboxymethyl starch, would also benefit by treatment with a polyquaternary amine.

Certain polymers not possessing full anionic character may also be surface treated with polyquaternary amines to acquire improved water absorption properties. Most notable are polymers based on acrylamide or acrylonitrile. The amide and nitrile functionalities both possess sufficient charge polarity to render the functionality partially anionic as viewed by the strongly positively-charged quaternary functionality of the polyquaternary amine. The partial negative charge of the amide or nitrile group, bearing a deceptive resemblance to a truly anionic moeity, allows the polyquaternary amine to become aligned electrostatically along the polymer in much the same way that the polyquaternary amine aligns with truly anionic polymers. This phenomena has been observed previously since polyquaternary amines are substantive to the amide linkages in proteins and keratin.

Although any water-absorbent resin having one or more anionic or pseudo-anionic functionalities should exhibit improved liquid absorption properties after surface tretment with a polyquaternary amine, to achieve the full advantage of the present invention, polymers containing neutralized carboxyl groups are particularly and unexpectedly improved by the surface treatment of the present invention. The carboxyl group is easily and economically introduced into the polymer by polymerization of carboxyl-containing monomers or hydrolysis of polyacrylamides, polyacrylate esters, or polyacrylonitriles. The carboxyl group is easily and essentially completely neutralized by any of a number of alkali metal hydroxides, ammonia or amines. The carboxyl group neutralization is extremely important in that it imparts a strong anionic character to the polymer and it acts to uncoil and straighten out the polymer in aqueous fluids to facilitate contact with the polyquaternary amine. The strong anionic character of the carboxyl group is preferred by the cationic polyquaternary amine and leads to substantially improved liquid absorption qualities of the resin.

It is believed that the highly cationic nature of the polyquaternary amine leads to ionic bond formation between the anionic substituents of the resin, preferably carboxylate, and the quaternary ammonium nitrogen of the polyquaternary amine. Due to the number of carboxylate and quaternary ammonium groups, the two groups will ionically bond in a bridging-type arrangement and create voids leading to increased liquid absorption. Evidence of strong electrostatic bonding and bridging is evidenced by the fact that the highly water-soluble polyquaternary amines are not flushed away during water absorption. In addition, surface treatment of a water-absorbent polymer with a non-quaternized polyamine did not produce the dramatic increases in liquid absorption found in the polyquaternary amine surface treatment.

Polyquaternary amines are readily available products from a number of commercial sources. The actual chemical structure of the polyquaternary amine will depend upon the starting materials used to synthesize the polyquaternary amine, with the diversity of available starting materials leading to polyquaternary amines of quite diverse structure. Among the various polyquaternary amines available are condensation products of hexamethylenediamine, dimethylamine, and epichlorohydrin; condensation products of dimethylamine and epichlorohydrin; copolymers of hydroxyethyl cellulose and diallyldimethyl ammonium chloride; copolymers of acrylamide and beta-methacrylyloxyethyl trimethyl ammonium chloride; hydroxyethyl cellulose reacted with epichlorohydrin, then quaternized with trimethylamine; or homopolymers of diallyldimethyl ammonium chloride. Polyquaternary amines may also be synthesized by the reaction of dimethyl sulfate with polymers such as polyethyleneimines, copolymers of vinyl pyrrolidone and dimethylaminoethyl methacrylate, or copolymers of ethyl methacrylate, abietyl methacrylate and diethylaminoethyl methacrylate. Regardless of the overall chemical structure, each of the polyquaternary amines possesses the positively-charged ammonium nitrogen atom required for interaction with the negatively-charged moiety of the water-absorbent polymer.

The polyquaternary amines are available in a wide molecular weight range, however, for the present invention the preferred molecular weight of the polyquaternary amine ranges from about 200 to about 5000. To achieve the full advantage of the present invention, the molecular weight range of the polyquaternary amine is between about 300 and about 4000. Suitable polyquaternary amines are exemplified by the following tradename products:

MAGNIFLOC 577C from American Cyanamid Co.;
MAGNIFLOC 579C from American Cyanamid Co.;
MAGNIFLOC 581C from American Cyanamid Co.;
MIRAPOL WT from National Chemical Co., Inc.;
RETEN 205 from Hercules, Inc.;
RETEN 210 from Hercules, Inc.;
RETEN 220 from Hercules, Inc.;
UCARE Polymer JR-30M from Union Carbide Corp.;
UCARE Polymer JR-125 from Union Carbide Corp.;
GAFQUAT 734 from GAF Corp.; and
GAFQUAT 755 from GAF Corp.

However, other polyquaternaries can be used in the present invention.

In accordance with the present invention, it has been found that surface treatment of a water-absorbent resin, preferably a cross-linked polyacrylate resin possessing a plurality of neutralized carboxyl groups, with a polyquaternary amine substantially and unexpectedly increases the water-absorbent qualities of the resin while retaining the necessary "dry feel" of the resin. In a preferred method, the polyquaternary amine surface treatment is performed immediately following the polymerization, drying and sizing steps. To achieve the full advantage of the present invention, the polyquaternary amine is dispersed in a suitable solvent to produce a solution containing 0.1% to 20% polyquaternary amine by weight. Suitable solvents include liquids capable of solubilizing the polyquaternary amine and of rapid and complete evaporation. Such solvents include the lower alcohols, especially methanol or isopropyl alcohol; lower ketones, such as acetone or methyl ethyl ketone; and other such low molecular weight organic solvents. Water is not a recommended solvent due to its low evaporation rate and its absorption by the water-absorbent resin, while methanol has been found to be the most advantageous polyquaternary amine diluent.

The polyquaternary amine-methanol solution is evenly sprayed onto the surface of the water-absorbent resin, followed by a blending operation to attain a uniform coating of the polyquaternary amine on the surface of the polymer. After blending and methanol evaporation, the water-absorbent resin is thereby surface coated with 0.1% to 5.0% (by dry weight) of a polyquaternary amine. It is not essential to treat the water-absorbent resin immediately after synthesis and drying, since surface treatment of the water-absorbent polymer at any time prior to use will yield the new and unexpected results described herein.

To demonstrate the new and unexpected results achieved by surface treating partially or fully neutralized homopolymers of acrylic acid or copolymers of acrylic acid with acrylamide, and styrene or methyl methacrylate with a polyquaternary amine, attention is directed to FIGS. 1 through 17. Each acrylate polymer was synthesized in the same manner as described below for the homopolymer of acrylic acid. In each case, the styrene or methyl methacrylate content of the copolymer is included at the expense of acrylic acid.

| CHEMICALS | |
|---|---|
| ACRYLIC ACID | 58.81% |
| POTASSIUM HYDROXIDE | 11.76% |
| AMMONIUM CARBONATE | 11.76% |
| N,N—METHYLENEBISACRYLAMIDE | 0.03% |
| AZO POLYMERIZATION INITIATORS (5% wt. aqueous) | 0.15% |
| AMMONIUM HYDROXIDE (30% wt. aqueous ammonia) | 14.70% |
| $H_2O$ | 2.79% |
| TOTAL | 100.00% |

Initially, the acrylic acid, plus any acrylamide, and styrene or methyl methacrylate, is combined with the potassium hydroxide, ammonium carbonate and ammonium hydroxide. Thereafter, 0.03% of the polyvinyl monomer, N,N-methylenebisacrylamide, is added to prepare an aqueous solution of potassium acrylate and ammonium acrylate having a degree of neutralization of about 70% to about 90%. The aqueous solution is maintained at 70° C., and into the solution is admixed 0.15% of 2,2'-azobis-(2-amidino-propane) hydrochloride in aqueous solution. When desired, up to 15% based on the combined weight of the monomers of an organic solvent having a boiling point of 40° C. to 150° C. may be used to aid in temperature control during polymerization.

The mixture is poured onto a traveling endless belt and spred thereover in the form of a layer about 10 mm in thickness. About 30 seconds thereafter, the mixture starts to polymerize, and the exothermic reaction is complete in about one minute. The maximum temperature of the mixture during the reaction is about 130° C., therefore sufficient to evaporate any water or solvent initially present with the monomer mixture.

The polymer is allowed to complete curing for about 30 minutes at ambient temperature, allowing water and solvent sufficient time to evaporate, to give a dry solid strip of potassium/ammonium polyacrylate homo- or copolymer having a water content of less than 15% and a residual monomer concentration of about 1000 ppm without the need of a separate drying step. The solid strip of polymer is pulverized into a powder, then surface treated by evenly spraying a methanol solution containing from about 0.1% to about 20% by weight of a polyquaternary amine over the powder until it is surface treated with from about 0.1% to 5% of the polyquaternary amine by dry weight. A separate blending operation, or the packaging operation, serves to evenly distribute the surface-treated resin throughout the product. This same procedure is used for homopolymers of acrylic acid or the copolymers of acrylic acid with acrylamide, styrene, methyl methacrylate or other ethylenically unsaturated monomers.

The results shown in FIGS. 1 through 17 were obtained using a gravometric absorbency testing system (GATS). In FIG. 1, the homopolymer of acrylic acid made in accordance with the above procedure is placed in contact with water under a retaining disc exerting 0.5 psig pressure on the polymer for 20 minutes to determine an initial rate of water absorption and, after 20 minutes, the pressure above the polymer is reduced to 0.02 psig with a lighter retaining disc for 10 minutes to determine a total water absorption. At a 30 minute time interval, the pressure above the polymer is again increased to 0.5 psig to determine a total amount of water retained by the polymer. Water absorption readings determined by increase in polymer weight were taken at the 1 and 3 minute time periods to determine an initial rate of water absorption. A reading was taken at the 20 minute time interval to determine the total water absorbed under the 0.5 psig retaining disc and water absorption readings taken at the 30 minute time interval to determine the total water absorbed by the polymer. Readings taken at a 35 minute time interval with the 0.5 psig retaining weight on the polymer were taken to determine the total amount of water retained by the polymer. The readings on the lower coordinate, or x axis of the graph of FIG. 1 represent the grams of water absorbed per 0.1 gram of polymer and are as follows: 1 minute, 1.45; 3 minutes, 1.72; 20 minutes, 2.22; 30 minutes, 3.19, 35 minutes, 2.63.

Referring to FIG. 2, the same procedure was used to determine the initial water absorbency, total water absorbency and total water retention of the same homopolymer tested previously, after surface treatment with 0.3% by dry weight of a polyquaternary amine. As seen in FIG. 2, the total water absorbency measured at the 30 minute interval increased from 3.19 gms of water absorbed per 0.1 gm of polymer to 3.78 gms of water absorbed per 0.1 gm of polymer, an increase of over 18%. Likewise, the total amount of water retained increased from 2.63 gm to 2.89 gm per 0.1 gm of polymer, or an increase of about 10%. The absorption rates, tested at 1 minute and 3 minutes, also showed increaes of over 26% and of over 10% for the surface treated polymer compared to the untreated polymer. These and the other results listed in TABLE I are most surprising in the art of water absorbent polymers.

Figure 17:
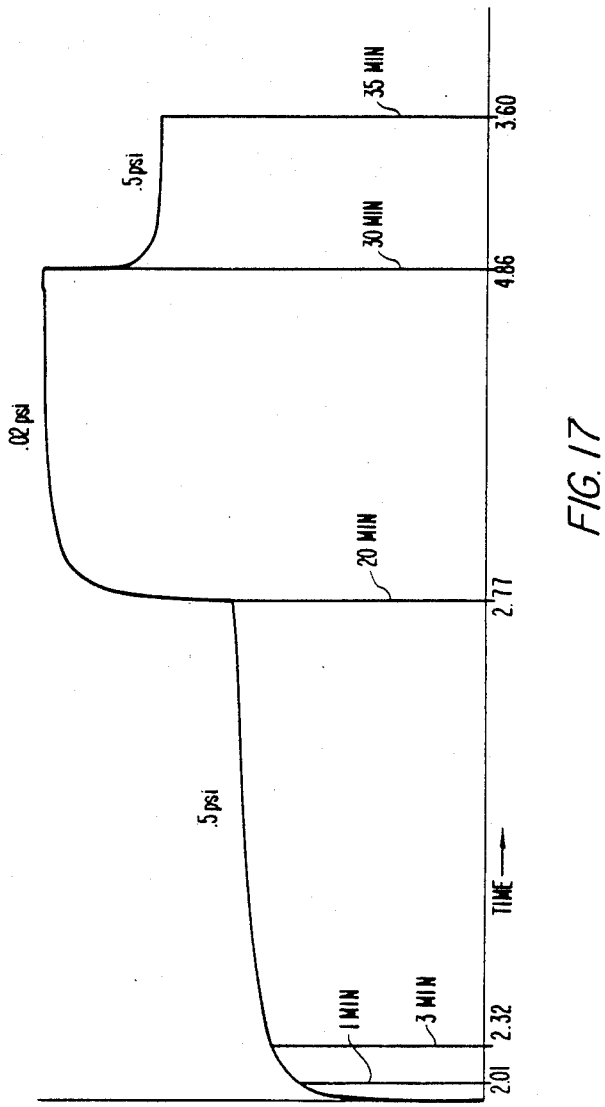
FIG. 17 is a GATS graph showing water absorbency vs. time for an acrylic-styrene copolymer having 4% styrene with surface treatment by 0.5% of a low molecular weight (e.g. molecular weight of about 300 to about 500) polyquaternary amine (by dry weight).

In each of the first 16 FIGS., the indicated polymer was treated with the listed percentage of MAGNIFLOC 579C, a polyquaternary amine with highly cationic properties and of moderate, e.g. 2000-4000, molecular weight. In FIG. 17, the polyquaternary amine used to surface treat the water-absorbent resin was a low molecular weight, e.g. 300-500, dimethylamine-epichlorohydrin condensation product. Comparison of FIG. 8 and FIG. 17 indicate that molecular weight of the polyquaternary amine does not effect the initial water absorption rate, however, the total amount of water absorbed and retained shows much greater improvement with the higher molecular weight polyquaternary amine.

TABLE I

| Polymer (Amount of Surface Treatment) | Gm. $H_2O$ Absorbed/.1 g Polymer | | | | |
|---|---|---|---|---|---|
| | .5 psi after 1 min. | .5 psi after 3 min. | .5 psi after 20 min. | .02 psi after 30 min. | .5 psi after 35 min. |
| 1. Neutralized polyacrylic acid (no treatment) | 1.45 | 1.72 | 2.22 | 3.19 | 2.63 |
| 2. Neutralized polyacrylic acid (0.3% polyquat.) | 1.83 (26%) | 2.05 (19%) | 2.49 (12%) | 3.78 (18%) | 2.89 (10%) |
| 3. Neutralized polyacrylic acid 1% styrene (no treatment) | 1.45 | 1.59 | 2.00 | 3.52 | 2.66 |
| 4. Neutralized polyacrylic acid 1% styrene (0.3% polyquat.) | 1.96 (35%) | 2.10 (32%) | 2.34 (17%) | 3.53 (0.25%) | 2.64 (−0.75%) |
| 5. Neutralized polyacrylic acid 2% styrene (no treatment) | 1.46 | 1.61 | 2.19 | 4.21 | 3.11 |
| 6. Neutralized polyacrylic acid 2% styrene (0.3% polyquat) | 2.34 (60%) | 2.72 (69%) | 2.93 (33%) | 5.20 (23%) | 3.70 (19%) |
| 7. Neutralized polyacrylic acid 4% styrene (no treatment) | 1.56 | 1.75 | 2.19 | 4.62 | 3.41 |
| 8. Neutralized polyacrylic acid 4% styrene (0.5% polyquat.) | 2.11 (35%) | 2.54 (45%) | 2.85 (30%) | 5.22 (13%) | 3.73 (9%) |
| 9. Neutralized polyacrylic acid 6% styrene (no treatment) | 1.99 | 2.20 | 2.81 | 4.92 | 3.51 |
| 10. Neutralized polyacrylic acid 6% styrene (0.6% polyquat.) | 2.65 (33%) | 3.13 (42%) | 3.33 (18%) | 5.83 (18%) | 4.19 (19%) |
| 11. Neutralized polyacrylic acid 10% styrene (no treatment) | 1.47 | 1.75 | 2.38 | 3.70 | 3.13 |
| 12. Neutralized polyacrylic acid 10% styrene (0.5% polyquat.) | 1.85 (26%) | 2.32 (32%) | 2.79 (17%) | 5.24 (41%) | 3.92 (25%) |

TABLE I-continued

| Polymer (Amount of Surface Treatment) | Gm. H₂O Absorbed/.1 g Polymer | | | | |
|---|---|---|---|---|---|
| | .5 psi after 1 min. | .5 psi after 3 min. | .5 psi after 20 min. | .02 psi after 30 min. | .5 psi after 35 min. |
| 13. Neutralized polyacrylic acid 15% styrene (no treatment) | 1.39 | 1.50 | 2.06 | 4.35 | 3.13 |
| 14. Neutralized polyacrylic acid 15% styrene (0.5% polyquat.) | 1.51 (8%) | 1.76 (17%) | 2.50 (21%) | 5.19 (19%) | 4.16 (33%) |
| 15. Neutralized polyacrylic acid 10% methyl methacrylate (no treatment) | 1.61 | 1.79 | 2.39 | 4.55 | 3.09 |
| 16. Neutralized 10% methyl methacrylate (0.8% polyquat.) | 2.89 (79%) | 3.00 (67%) | 3.13 (31%) | 4.97 (9%) | 3.82 (23%) |
| 17. Neutralized polyacrylic acid 4% styrene (.5% low molecular weight polyquat.) | 2.01 (28%) | 2.32 (32%) | 2.77 (26%) | 4.86 (5%) | 3.60 (2%) |
| Overall average percent improvement of surface-treated polymer over non-treated polymer | 36% | 39% | 22% | 16% | 15% |

( ) = % improvement

The tabulated percentages show substantial and unexpected improvements in water absorption properties of polyquaternary amine-surface treated polymers over the corresponding untreated polymer. In each case, the polymers retained their "dry feel", and had faster initial water uptake, showing that the water is dispersed more quickly throughout the polymer. The increased retention properties indicate that the polyquaternary amine assists water absorption by the polymer through other than merely surface tension reduction of the absorbed liquid. Polyquaternary amines do possess some surface activity whereby the surface tension of water is lowered for faster absorption by the resin. However, the increased water retention by the polymer shows that the polyquaternary amine interacts with a polymer in some fashion to increase the rate and amount of liquid absorbed and retained.

In accordance with the new and unexpected features of the present invention, it has been found that surface treating anionic or pseudo-anionic water-absorbent homopolymers or copolymers with polyquaternary amines substantially increases the initial rate of water absorption, the total amount of water absorbed and the total water retention capacity of the polymer over the corresponding untreated polymer. It appears that moderate weight average molecular weight (2000–4000) polyquaternary amines better serve to improve the water-absorbent properties of the polymers than low molecular weight (200–1000) polyquaternary amines. It was also found that the surface treatment of the polymer is independent of the method of synthesis of the polymer since treatment of a polymer immediately after synthesis matched the improved water-absorption results of surface treatment of a commercial polymer long after synthesis. The GATS data also shows that surface treatment with a polyquaternary amine will improve the water-absorbent capabilities of already superior water-absorbent polymers. For example, FIGS. 1 and 2 show an 18% increase (from 3.19 g to 3.78 g of water absorbed) in total water absorption by treating neutralized polyacrylic acid with 0.3% by weight of a polyquaternary amine. However, from FIGS. 7 and 8, it is seen that neutralized polyacrylic acid containing 4% styrene, absorbs 4.62 g of water prior to surface treatment; a total absorption clearly superior to the neutralized polyacrylic acid of FIGS. 1 and 2. However, surface treatment with 0.5% by weight with a polyquaternary amine improves this already superior total water absorption by another 13% to 5.22 g of water absorbed. Thus, the present invention is capable of substantially improving the water-absorbent properties of marginal or superior water-absorbent resins.

It should be understood that the present disclosure has been made only by way of preferred embodiment and that numerous changes in details of construction, combination, and arrangement of parts may be resorted to without departing from the spirit and scope of the invention as hereunder claimed.

What is claimed and sought to be secured by Letters Patent of the United States is:

1. A method of absorbing water comprising mixing a monomer solution of (A) acrylic acid, neutralized 70 to 100 mole percent, (B) styrene and/or methyl methacrylate in an amount of 0% to 25% based on the weight of acrylic acid and (C) acrylamide in a mole ratio of acrylic acid:acrylamide in the range of 70:30 to 100:0; (D) a water soluble or water miscible polyvinyl monomer cross-linking agent in an amount of 0.001 to 0.3 percent by weight of (A) plus (B) plus (C); and water to form a mixed monomer solution, wherein the monomers of the mixed monomer solution consist essentially of (A), (B), (C) and (D) and the monomer concentration is below 70 percent by weight of the monomer solution prior to polymerization; and initiating polymerization of monomers (A) and (B) such that during polymerization, the exothermic heat of reaction is substantially the only heat energy used to accomplish polymerization, cross-linking and to drive off sufficient water to form a water-absorbent cross-linked polyacrylate resin having a water content of 15 percent by weight or less, followed by contacting said resin with a polyquaternary amine in an amount of from about 0.1% to about 5.0% based on the weight of said resin, and thereafter contacting said polyquaternary amine treated resin with water to absorb water into said treated resin.

2. The method as defined in claim 1 wherein the combined concentration of the monomers (A), (B) and (C) is at least 30 wt. % and less than 70 wt. %.

3. The method as defined in claim 1 wherein the mixed monomer solution has a temperature of 20° to 85° C. prior to polymerization.

4. The method as defined in claim 1 wherein monomer (C) is selected from the group consisting of N,N-methylenebisacrylamide and N,N-methylenebismethacrylamide.

5. The method as defined in claim 1 wherein the mixed monomer solution contains 1 to 10 wt. % of an organic solvent based on the weight of monomers (A), (B) and (C).

6. The method as defined in claim 1 wherein the solid cross-linked resin is treated with from about 0.25% to 2.0% by dry weight of a polyquaternary amine based on the weight of said resin.

7. The method as defined in claim 1 wherein the polyquaternary amine has a molecular weight from about 200 to about 5000.

8. The method as defined in claim 1 wherein the polyquaternary amine has a molecular weight from about 300 to about 4000.

9. The method as defined in claim 1 wherein the polyquaternary amine is a condensation product of hexamethylenediamine, dimethylamine and epichlorohydrin; a condensation product of dimethylamine and epichlorohydrin; or quaternized polyethylenimine.

10. A process as defined in claim 1 whereby the polyquaternary amine is dispersed in a non-aqeuous solvent from about 0.1% to about 20% by weight before contacting the solid water-absorbent resin.

11. A process as defined in claim 10 whereby the non-aqueous solvent is methanol, isopropyl alcohol, acetone, methyl ethyl ketone or mixtures thereof.

12. A process for absorbing water comprising:
combining a monomer mixture of (A) potassium acrylate; (B) styrene and/or methyl methacrylate in an amount of 0% to 25% based on the amount of acrylate computed based on the weight of acrylic acid; and (C) a polyvinyl monomer, with water in an amount of at least 30 combined weight percent of (A) plus (B) plus (C) based on the total weight of (A) plus (B) plus (C) plus water to form a monomer mixture wherein the monomers of the monomer mixture consist essentially of (A), (B) and (C);
adding a polymerization initiator to said monomer mixture capable of initiating, and in an amount sufficient to initiate polymerization of said monomer mixture;
copolymerizing said monomer mixture while utilizing the exothermic heat of reaction as substantially the only non-ambient energy source to drive water away from said polyacrylate resin copolymer to form said cross-linked resin copolymer having a water content sufficiently low to be powdered without an intermediate drying step;
thereafter contacting said cross-linked resin copolymer with a polyquaternary amine in an amount of from about 0.1% to about 5.0% based on the weight of said cross-linked resin copolymer; and
thereafter contacting said polyquaternary amine-treated resin with water to absorb water into said treated resin.

13. The process of claim 12 further including the step of adjusting the temperature of the monomer mixture to a temperature of 25° to 85° C. prior to adding said polymerization initiator to said monomer mixture.

14. The process of claim 12 wherein said polymerization initiator is added in an amount of at least 0.5% based on the total weight of monomers (A), (B) and (C).

15. The process of claim 12 wherein the water content of said cross-linked resin copolymer is not greater than about 10% by weight as recovered from the polymerized mixture, without an additional drying step.

16. The process of claim 12 including the step of pulverizing said cross-linked resin to form a powder prior to contacting said powder with said polyquaternary amine.

17. The process of claim 12 wherein the cross-linked resin copolymer is treated with from about 0.25% to about 2.0% of the polyquaternary amine based on the weight of said cross-linked resin copolymer.

18. The process of claim 16 wherein the cross-linked resin copolymer is treated with from about 0.25% to about 2.0% of a polyquaternary amine based on the weight of said cross-linked resin copolymer.

19. The process of claim 12 wherein the polyquaternary amine has a molecular weight from about 200 to about 5000.

20. The process of claim 12 wherein the polyquaternary amine has a molecular weight from about 500 to about 3000.

21. The process of claim 12 wherein the polyquaternary amine is a condensation product of hexamethylenediamine, dimethylamine and epichlorohydrin; a condensation product of dimethylamine and epichlorohydrin; or quaternized polyethylenimine.

22. The process of claim 12 wherein the polyquaternary amine is dispersed in methanol from about 0.1% to about 20% by weight before contacting the cross-linked resin copolymer.

23. A method of absorbing water comprising mixing a monomer solution of (A) acrylic acid, neutralized 70 to 100 mole percent, (B) styrene and/or methyl methacrylate in an amount of 0% to 25% based on the weight of acrylic acid and (C) acrylamide in a mole ratio of (A):(C) in the range of 70:30 to 100:0; (D) a water soluble or water miscible polyvinyl monomer cross-linking agent in an amount of 0.001 to 0.3 percent by weight of (A) plus (B) plus (C); and water to form a mixed monomer solution, wherein the monomers of the mixed monomer solution consist essentially of (A), (B), (C) and (D); and initiating polymerization of monomers (A), (B) and (C) such that during polymerization, the exothermic heat of reaction is substantially the only heat energy used to accomplish polymerization, cross-linking and to drive off sufficient water to form a water-absorbent cross-linked polyacrylate resin composition having a water content of 15 percent by weight or less;
thereafter contacting said water-absorbent cross-linked polyacrylate resin with a polyquaternary amine in an amount sufficient to increase the water absorbency of said resin based on the weight of said water-absorbent cross-linked polyacrylate; and
thereafter contacting said polyquaternary amine-treated resin with water to absorb water into said treated resin.

24. The method of claim 23 wherein the cross-linked polyacrylate resin is contacted with the polyquaternary amine in an amount of 0.1% to 5.0% based on the total weight of contacted resin.

25. The method of claim 23 wherein the water content of said cross-linked polyacrylate resin copolymer is not greater than about 10% by weight as recovered from the mixed monomer solution after copolymerization, without an additional drying step.

26. The method of claim 23 including depositing said monomer mixture including said initiator onto a support surface in sheet form for polymerization and cross-linking, followed by pulverizing the resultant cross-linked resin to form a powder, and thereafter contacting said powder with a polyquaternary amine in an amount of from about 0.1% to 5.0% based on the weight of said powder.

27. A method of absorbing water comprising surface treating a water-absorbent resin containing neutralized carboxyl, neutralized sulfonate, neutralized phosphate, amide or nitrite functionalities with a sufficient amount of a polyquaternary amine to substantially increase the water absorption of said water-absorbent resin, and thereafter contacting said polyquaternary amine treated resin with water to absorb water into said treated resin.

28. The method according to claim 27 wherein the water-absorbent resin contains neutralized carboxyl functionalities.

29. The method according to claim 27 wherein the water-absorbent resin is treated with from about 0.1% to about 5.0% by dry weight of a polyquaternary amine.

30. The method according to claim 27 wherein the water-absorbent resin is treated with from about 0.25% to about 2% by dry weight of a polyquaternary amine.

31. The method of claim 27 wherein the polyquaternary amine has a molecular weight from about 200 to about 5000.

32. The method of claim 27 wherein the polyquaternary amine has a molecular weight from about 300 to about 4000.

* * * * *